United States Patent
Quinlan et al.

[11] Patent Number: 6,118,881
[45] Date of Patent: Sep. 12, 2000

[54] REDUCTION OF FLOW-INDUCED MICROPHONE NOISE

[75] Inventors: Daniel A. Quinlan, Warren, N.J.; Hanh Vu-Maesto, Oxford, Mass.

[73] Assignee: Lucent Technologies Inc., Murray Hill, N.J.

[21] Appl. No.: 08/853,736

[22] Filed: May 13, 1997

[51] Int. Cl.[7] .............................. H04R 9/08; H04R 11/04; H04R 17/02

[52] U.S. Cl. ............................................ 381/356; 379/433

[58] Field of Search .............................. 381/160, 91, 355, 381/356, 357, 358–360; 379/433

[56] References Cited

U.S. PATENT DOCUMENTS

| | | |
|---|---|---|
| 4,570,746 | 2/1986 | Das . |
| 4,600,077 | 7/1986 | Drever . |
| 4,850,016 | 7/1989 | Groves ..................................... 379/433 |
| 4,966,252 | 10/1990 | Drever . |
| 4,975,966 | 12/1990 | Sapiejewski . |
| 5,216,711 | 6/1993 | Takagi ..................................... 381/356 |
| 5,263,093 | 11/1993 | Nakamura .............................. 381/357 |
| 5,442,713 | 8/1995 | Patel . |
| 5,615,273 | 3/1997 | Lucey ...................................... 381/355 |
| 5,682,418 | 10/1997 | Ide ......................................... 379/433 |
| 5,854,848 | 12/1998 | Tate ........................................ 381/357 |

OTHER PUBLICATIONS

Notes on Sound Absorption Technology, Noise Control Foundation, Version 94–02, Notebook #3, Ingard, K. Uno Chapter 2, pp. 26–28; Chapter 10, pp. 17–18, New York, 1994.

Some Investigations on Output Level of Microphones in Air Streams, The Journal of the Acoustical Society of America, vol. 46, No. 6 (Part 1), pp. 1391–1396, Nakamura, A., Matsumoto, R., Sugiyama, A., and Tanaka, T., Mar. 10, 1969.

*Primary Examiner*—Minsun Oh Harvey
*Attorney, Agent, or Firm*—Geraldine Monteleone; Kenneth M. Brown

[57] ABSTRACT

Flow-induced noise affecting microphones used in such applications as cellular phones is reduced by providing a deflector, made of an acoustically transmissive, high flow resistance material, disposed at a certain distance from the microphone pressure sensing area. The distance between the pressure sensing are and the deflector may be determined experimentally in consideration of any space constraints imposed by the specific application, and for cellular phones in particular, is approximately as little as 2 or 3 mm from the outside surface of the deflector.

31 Claims, 2 Drawing Sheets

REDUCTION OF FLOW-INDUCED MICROPHONE NOISE

FIELD OF THE INVENTION

The invention relates to the reduction of flow-induced noise for sound pickup devices, in particular for microphones in cellular phones.

BACKGROUND OF THE INVENTION

It is well-known that wind flow over a microphone will induce significant amounts of low frequency noise. For example, signals from microphones used in wind tunnels, active-noise control systems and other flow related systems are often corrupted by flow-induced noise. Moreover, such flow-induced noise is a problem for various types of voice transmission and sound recording systems. It is a particular problem for digital speech encoding systems and communication handsets such as cellular phones, when used, for example, outdoors or by open windows in automobiles. For such devices, flow-induced noise can also be caused by the users as they speak into the device.

In digital speech encoding systems, the speech signal is not only degraded by the transmission of the flow-induced noise itself (that is, the listener on the other end would hear noise as well as speech, as would be the case in analog systems), but also by the artifacts and distortion created as the noise is passed through speech encoding-decoding processing. As the speech decoder attempts to recreate the noise as speech, this distortion makes the speech itself difficult for the listener to perceive.

Although there are several devices in the prior art that attempt to eliminate or reduce microphone flow noise, they generally are not acceptable for such applications as cellular phones. As cellular phones become increasingly compact and the parts contained therein more miniaturized, there is less and less space available to accommodate these prior art devices. For example, microphones may be enclosed within windsocks, wind shrouds or windscreens of various constructions. These devices may be ineffective unless their dimensions are on the order of many centimeters and larger. In addition, they typically use foam, which deteriorates over time. Their size requirement and lack of durability make them unacceptable for cellular phone and other similar applications.

Unfortunately, other prior art techniques are similarly inapplicable for cellular phones. For example, as noted above, the trend to produce cellular phones that are as compact as possible encourages the miniaturization of component parts. This approach disfavors the well-known technique of increasing the diameter of the microphone to reduce the effect of flow noise. Active Noise Control (ANC), which necessitates the placement of a fluid dynamics sensor at a very small distance from the microphone, cannot be applied robustly and inexpensively for cellular phones. Only fragile sensors, such as a "hot" wire, are able to be placed close enough to the microphone. Further, the extra sensor, circuitry and processing required for ANC would give rise to additional costs.

Therefore, the problem of flow-induced noise for microphones in applications such as cellular phones remains to be addressed. Ideally, this noise should be reduced without adversely affecting the desired acoustic signal and without exceeding critical space limitations.

SUMMARY OF THE INVENTION

In accordance with the invention, flow-induced noise affecting microphones used in such applications as cellular phones is reduced by providing a deflector made of an acoustically transmissive, high flow resistance material disposed at a certain distance d from the microphone pressure sensing area. The microphone may be flush-mounted or recessed and connected to an opening or open port in the housing. The pressure sensing area is the pressure sensing face of the microphone, if the microphone is flush-mounted, or, if the microphone is recessed, the port to which it is connected. Distance d may be determined experimentally in consideration of any space constraints imposed by the specific application, and for cellular phones in particular, is approximately as little as 2 or 3 mm from the outside surface of the deflector. The deflector is designed such that it shields the microphone (or the open port to which it is connected) from wind flow.

The concept of a "spacer" between a microphone and a protective grid is known in the prior art. U.S. Pat. No. 4,975,R66, issued Dec. 4, 1990 to R. Sapiejewski, utilizes a spacer, among other techniques, in a boom microphone to reduce socalled puff noise.

However, in the context of a cellular phone, there is a tradeoff associated between creating a "spacer" and giving up valued space. In order to conserve space, the current placement of a microphone in cellular phones is typically very close to an aperture on the surface of the phone. Generally, there is no deflector specifically designed (e.g., having certain characteristics) to shield the microphone (or the port to which it is connected) from turbulence. In direct contrast, we have realized that the combination of providing such a deflector at a certain non-zero distance from the microphone pressure sensing area and using acoustically transmissive, high flow resistance material to shield the microphone (or port) produces unlikely and unexpected benefits.

Moreover, we have been able to define the characteristics of the high flow resistance material that, when used as a deflector shielding the microphone (or port), yields the most favorable result. Indeed, we have realized that there is an optimal design for this deflector and further, what this design should be. Specifically, for a cellular phone application with microphone size on the order of ⅛"–½", the optimal material is porous with an average opening dimension of about 0.01" or smaller and with approximately 35% or less of the deflector being an open area.

DETAILED DESCRIPTION

Figure 1:
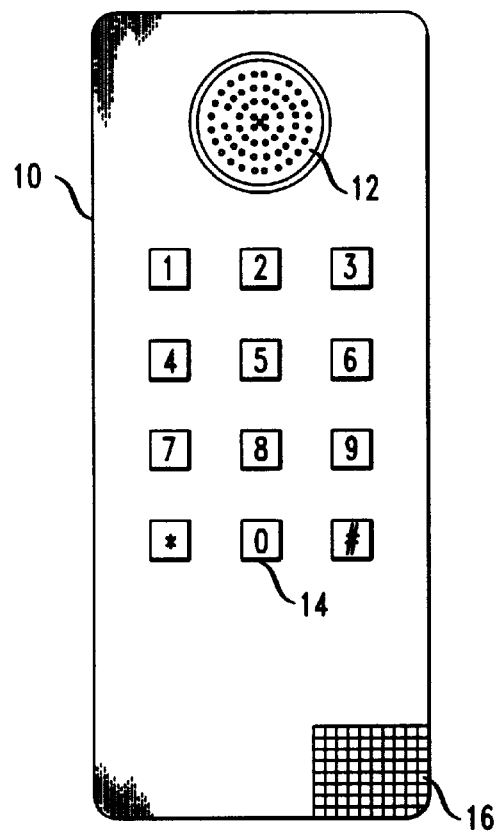
FIG. 1 is a top view of a cellular phone embodying the principles of this invention.
Figure 2:
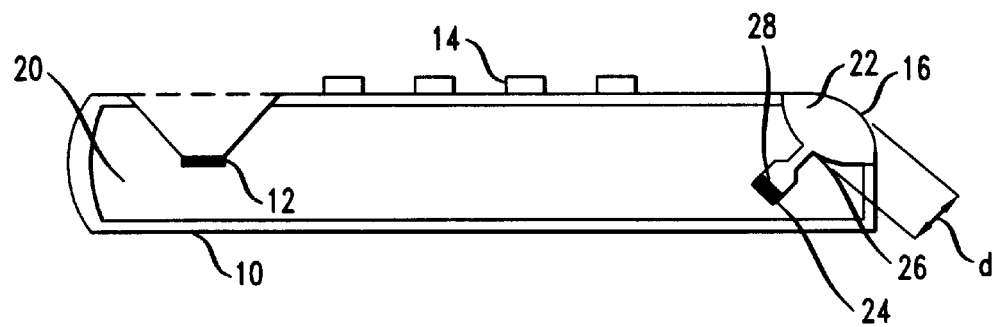
FIG. 2 is a side view of the cellular phone shown in FIG. 1.

FIGS. 1 and 2 illustrate a cellular phone embodying the principles of the invention. FIG. 1 is a top view of a cellular phone 10 with speaker 12 and keypad 14. FIG. 2 is a side view of cellular phone 10 which is comprised of a hollow housing 20 having an aperture 22 and an interior chamber into which the various phone components are placed. In FIG. 2, aperture 22 is illustratively achieved by an angular cutting of the bottom right corner of the top surface of the phone.

A microphone 24 is placed within the housing, preferably positioned such that the transducer or pressure-sensing face 28 (hereinafter, called the "top" of the microphone) is directly underneath aperture 22. The microphone may be flush-mounted or recessed within the housing and connected to an open port 26. For example, the microphone may be mounted within a boot which is positioned within the housing and opens to port 26. In alternate embodiments, the microphone is attached to open port 26 by a flexible, straight tube or other structure such that the microphone is within a "sealed" chamber that opens to port 26.

According to the invention, microphone 24, or the port to which it is connected 26, is shielded by a deflector made of an acoustically transmissive, high flow resistance piece of material 16. Since the flow-induced noise picked up by the microphone is due to the local turbulence around the microphone sensing area, this deflector is shaped so that the local turbulence is deflected away from the microphone sensing area.

The deflector may be made of any material that combines high flow resistance with low acoustic transmission loss. In the preferred embodiment, the optimal material is porous with an average opening dimension of about 0.01" or smaller and with approximately 35% or smaller of the deflector being open area. Materials with smaller openings and open areas will provide marginally improved flow noise reduction performance, whereas materials with larger openings and larger open areas will provide significantly reduced performance.

Examples of suitable material for the deflector include metal meshes or sintered metal. However, any preferably thin material exhibiting similar or higher flow resistance may be used, including but not limited to, any woven or compressed fiber fabrics, fiberglass, etched plastic, perforated plastic, metal felt, and Mylar® brand of polyester film. Since the relative stiffness of materials varies, many applications will require some form of integral rigid support to keep the deflector from being damaged during use. This support could be provided by a phenolic or other resin-like coating which partially covers the deflector.

The flow resistance of a porous layer is defined in the art as the ratio between the pressure drop, $\Delta p$, across the layer and the average velocity u of steady flow through the layer. Normalized DC flow resistance, $\theta_s$, is defined as approximately equal to $25.6\ sL\mu/d^2\rho C$, where s=open area fraction, L=thickness (or wire diameter in the case where the deflector is a wire mesh), $\mu$=shear viscosity, d=channel width or tube diameter (or width of the openings in the mesh), $\rho$=mass density, and c=speed of sound (Uno Ingard, *Notes on Sound Absorption Technology,* Noise Control Foundation, New York, 1994). Using this equation and data in the above reference, any material having $\theta_s$ estimated to be a minimum of about 0.01 would be considered to be a high flow resistance material in the context of this invention. At 100 Hz the estimated flow resistance for this material should be about 0.01 or higher, and at 10,000 Hz, about 0.25 or higher.

The deflector is placed at a predetermined non-zero distance d measured from the microphone pressure sensing area to the outside surface of the deflector. The microphone may be either flush-mounted or recessed and connected to a port. In the preferred embodiment, the top of the microphone is located directly underneath the deflector. In general, noise reduction improves as the distance d between the microphone pressure sensing area and the deflector increases. However, in such applications as a cellular phone in which space is at a premium, the amount by which this distance may be increased is severely limited. However, we have ascertained that there is an optimal distance d with respect to the tradeoff between space and noise reduction at which unexpected significant decreases in noise are produced. Specifically, for cellular phones, distance d is about 2–3 mm.

There are other factors that may affect the performance of a microphone arrangement embodying the principles of the invention. For example, although the invention is applicable for any type of microphone, increasing the microphone size in an application will generally decrease flow-induced noise and improve the effectiveness of this invention. For the particular cellular phone embodiment discussed above, the diameter of the microphone is approximately ⅛".

Figure 3:
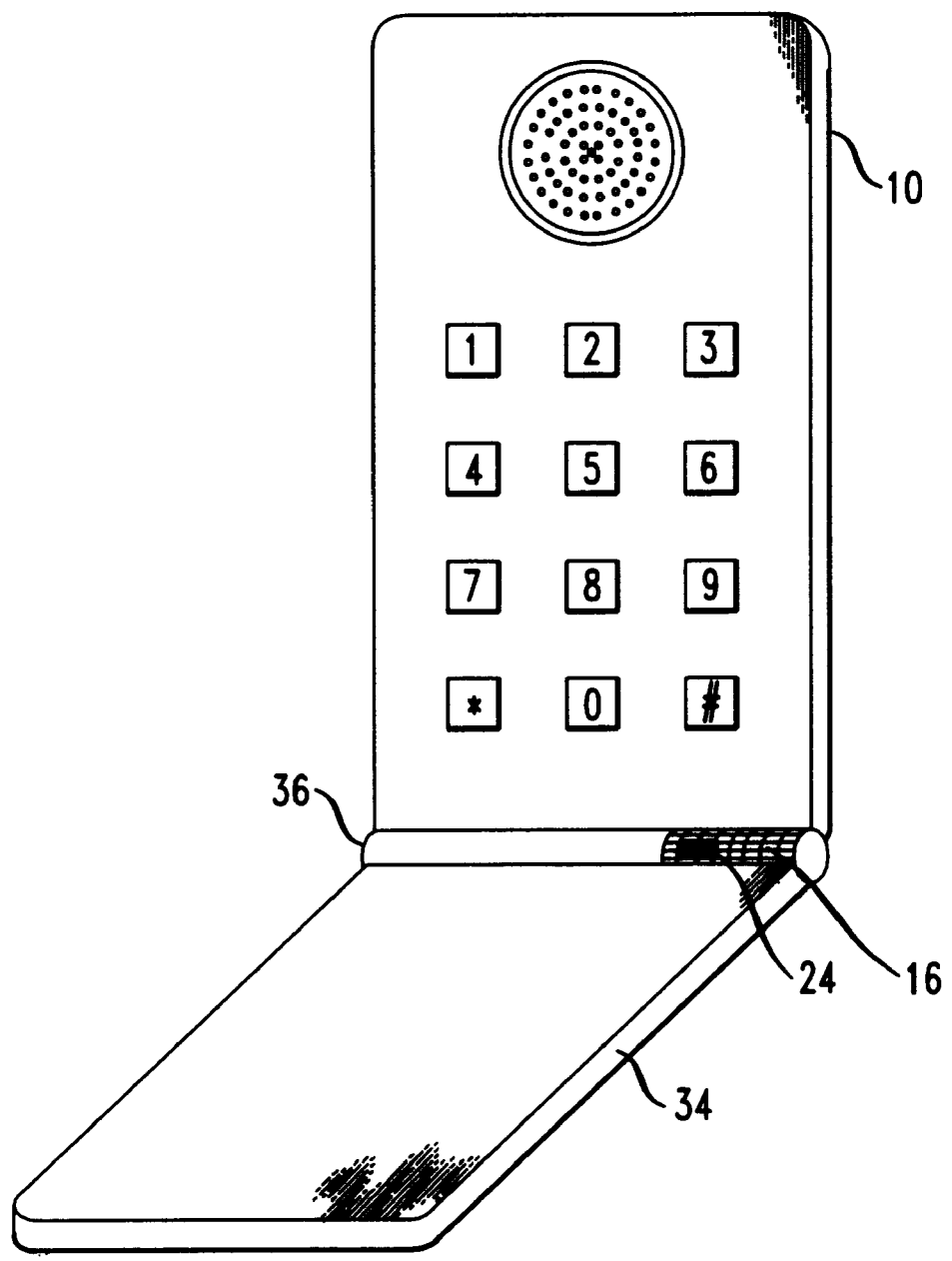
FIG. 3 illustrates an alternate microphone placement in a cellular phone in accordance with this invention.

The foregoing merely illustrates the principles of the invention. For example, FIG. 3 illustrates an alternate embodiment in which the cellular phone 10 has a flap 34 and the microphone 24 is placed under deflector 16 within the phone in the hinge area 36 from which the flap extends.

Moreover, although the disclosure hereof describes the characteristics of the optimal material, other less-effective materials, such as a #6 wire cloth (opening dimension of about 0.13" and open area of about 60%) did provide some reduction of flow-induced noise.

It will thus be appreciated that those skilled in the art will be able to devise numerous and various alternative arrangements which, although not explicitly shown or described herein, embody the principles of the invention and are within its spirit and scope.

We claim:

1. An apparatus comprising:
   a microphone having a pressure sensing area, and
   an acoustically transmissive, high flow resistance piece of material disposed at a distance of about 2–3 mm from said pressure sensing area, wherein said piece of material is shaped so that wind flow is deflected away from said pressure sensing area.

2. The apparatus of claim 1 wherein said apparatus is a cellular phone.

3. The apparatus of claim 1 wherein said material is wire mesh.

4. The apparatus of claim 1 wherein said material is Mylar.

5. The apparatus of claim 1 wherein said piece of material is porous with an average opening dimension of about 0.01" or smaller.

6. The apparatus of claim 5 wherein said piece of material is comprised of about 35% or less open area.

7. The apparatus of claim 6 wherein said piece of material has a normalized flow resistance $\theta_s$ of about 0.01 or higher.

8. The apparatus of claim 7 wherein said piece of material has a flow resistance of about 0.01 or higher at 100 Hz or about 0.25 or higher at 10,000 Hz.

9. The apparatus of claim 1 wherein said piece of material is porous with an average opening dimension of about 0.13" or smaller.

10. The apparatus of claim 1 wherein said piece of material is comprised of about 60% or less open area.

11. The apparatus of claim 1 wherein said material is wire cloth.

12. A cellular phone comprising:
    a microphone having a pressure sensing area, and
    an acoustically transmissive, high flow resistance piece of material disposed at a distance of about 2–3 mm from said pressure sensing area, wherein said piece of material is shaped so that wind flow is deflected away from said pressure sensing area.

13. The cellular phone of claim 12 wherein said piece of material is a wire mesh.

14. The cellular phone of claim 12 wherein said material is Mylar.

15. The cellular phone of claim 12 wherein said piece of material is porous with an average opening dimension of about 0.13" or smaller.

16. The cellular phone of claim 12 wherein said piece of material is comprised of about 60% or less open area.

17. The cellular phone of claim 12 wherein said material is wire cloth.

18. The cellular phone of claim 12 wherein said piece of material has a normalized flow resistance $\theta_s$ of about 0.01 or higher.

19. The cellular phone of claim 12 wherein said piece of material is porous with an average opening dimension of about 0.01" or smaller.

20. The cellular phone of claim 12 wherein said piece of material is comprised of about 35% or less open area.

21. The cellular phone of claim 12 wherein said piece of material has a flow resistance of about 0.01 or higher at 100 Hz or about 0.25 or higher at 10,000 Hz.

22. A cellular phone comprising:

a housing having an open port formed therein, a microphone disposed within a closed structure in said housing, said closed structure opening to said port, and an acoustically transmissive, high flow resistance piece of material disposed at a distance of about 2–3 mm from said port, wherein said piece of material is shaped so that wind flow is deflected away from said port.

23. The cellular phone of claim 22 wherein said material is a wire mesh.

24. The cellular phone of claim 22 wherein said material is Mylar.

25. The cellular phone of claim 22 wherein said piece of material is porous with an average opening dimension of about 0.13" or smaller.

26. The cellular phone of claim 22 wherein said piece of material is comprised of about 60% or less open area.

27. The cellular phone of claim 22 wherein said material is a wire cloth.

28. The cellular phone of claim 22 wherein said piece of material has a normalized flow resistance $\theta_s$ of about 0.01 or higher.

29. The cellular phone of claim 28 wherein said piece of material is porous with an average opening dimension of about 0.01" or smaller.

30. The cellular phone of claim 29 wherein said piece of material is comprised of about 35% or less open area.

31. The cellular phone of claim 30 wherein said piece of material has a flow resistance of about 0.01 or higher at 100 Hz or about 0.25 or higher at 10,000 Hz.

* * * * *